(12) United States Patent
Lien et al.

(10) Patent No.: US 7,004,032 B2
(45) Date of Patent: Feb. 28, 2006

(54) PRESSURE GAUGE MEASURING MULTIPLE PRESSURE VALUES

(75) Inventors: Johnson Lien, Hsinchu (TW); Cheng Chun Chung, Hsinchu (TW)

(73) Assignee: Taiwan Semiconductor Manufacturing Company, Hsin-Chu (TW)

( * ) Notice: Subject to any disclaimer, the term of this patent is extended or adjusted under 35 U.S.C. 154(b) by 0 days.

(21) Appl. No.: 10/637,346

(22) Filed: Aug. 8, 2003

(65) Prior Publication Data
US 2005/0028597 A1  Feb. 10, 2005

(51) Int. Cl.
*G01L 7/00* (2006.01)
(52) U.S. Cl. .......................... 73/700; 116/271
(58) Field of Classification Search ................. 73/700, 73/732, 715, 736, 716; 116/300, 301, 266; 340/451
See application file for complete search history.

(56) References Cited

U.S. PATENT DOCUMENTS

| | | | | |
|---|---|---|---|---|
| 2,991,757 | A * | 7/1961 | Dahle | 144/28.7 |
| 3,403,657 | A * | 10/1968 | Howitt | 116/293 |
| 3,425,391 | A * | 2/1969 | Honigman | 116/271 |
| 3,905,237 | A * | 9/1975 | Smalarz et al. | 73/708 |
| 4,107,996 | A * | 8/1978 | Hollingsworth et al. | 73/300 |
| 5,895,861 | A * | 4/1999 | Slonaker | 73/732 |
| 6,516,678 | B1 * | 2/2003 | Hamilton et al. | 73/866.3 |
| 6,640,656 | B1 * | 11/2003 | Hamilton et al. | 73/866.3 |
| 2002/0053236 | A1 * | 5/2002 | Hamilton et al. | 73/81 |
| 2003/0136206 | A1 * | 7/2003 | Hamilton et al. | 73/866.3 |

* cited by examiner

*Primary Examiner*—Edward Lefkowitz
*Assistant Examiner*—Andre Allen
(74) *Attorney, Agent, or Firm*—Duane Morris LLP

(57) ABSTRACT

A method for measuring multiple pressures by a single gauge (6) for simultaneously measuring separate pressures by respective pressure sensing elements (7, 8); and simultaneously indicating measurements of the separate pressures by respective pointers (11, 12) along a single gradient scale (14).

13 Claims, 3 Drawing Sheets

PRESSURE GAUGE MEASURING MULTIPLE PRESSURE VALUES

FIELD OF THE INVENTION

The present invention relates to a pressure gauge, and more particularly, to a pressure gauge that simultaneously measures multiple pressures.

BACKGROUND

A Bourdon tube pressure gauge comprises, a housing containing a sensing element, i.e., a Bourdon tube in an arc shape. The interior of the Bourdon tube is connected by a hollow coupling to a source of pressure to be measured. A change in the measured pressure causes elastic distortion of the Bourdon tube and a change in the arc shape. The end of the Bourdon tube undergoes displacement, which is translated by a pointer mechanism, to become a corresponding angular displacement of a pointer over a dial. The angular position of the pointer is proportional to the measured pressure that is indicated by a gradient scale on the dial. The hollow coupling extends into the hollow housing in which are mounted, the Bourdon tube, the pointer mechanism and the pointer. The interior of the housing is under atmospheric pressure that counteracts the pressure to be measured. Accordingly, the pointer indicates gauge pressure, i.e. differential pressure between atmospheric pressure on the Bourdon tube and the pressure being measured by the Bourdon tube.

A differential pressure gauge measures differential pressure between two sources of pressure other than atmospheric pressure. The differential pressure gauge has a housing containing a first Bourdon tube that measures a first pressure. The interior of the housing is filled with a fluid. Further, the housing interior has an expansible bladder immersed in the fluid. The interior of the bladder is connected by another hollow coupling to communicate with a source of second pressure. Expansion and contraction of the bladder in response to changes in the second pressure, causes a corresponding change in the pressure of the fluid, which counteracts displacement of the Bourdon tube in response to changes in the measured first pressure. Thus, the pointer indicates a differential pressure between the first measured pressure and the second measured pressure.

Prior to the invention, a conventional engineered fluid delivery process required control of fluid pressure, at an inlet end, to remain within an upper limit, as measured by a Bourdon tube gauge. Further, the engineered process required measurement of differential pressure from an inlet end to an outlet end of a fluid delivery conduit, for example, to determine delivery efficiency, mass flow rate and total mass flow, of the fluid being delivered. Thus, a second gauge was required, either a second Bourdon tube gauge at the outlet end, or a differential Bourdon tube gauge. The two gauges, at the inlet and outlet ends, were located at some distance apart, which caused delay in recording the readings of the gauges. Further, gauge calibration and maintenance were repeatedly performed for two gauges.

SUMMARY OF THE INVENTION

The present invention provides a single pressure gauge having multiple pointers that measure multiple pressures. Differential pressure is also measured. All measurements are recorded without delay. Further, a single gauge according to the invention involves less maintenance than does the two gauges that were required prior to the invention. The invention further provides a method of simultaneously indicating multiple pressure measurements along a single gradient scale.

DETAILED DESCRIPTION

Figure 1:
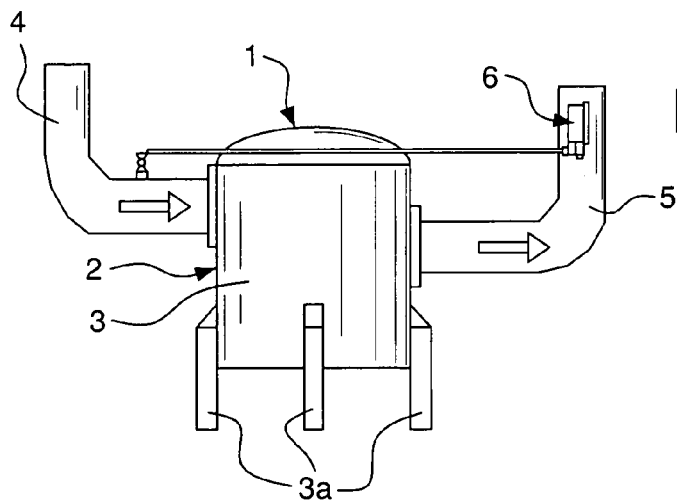
FIG. 1 is a side view of a fluid delivery apparatus.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Figure 2:
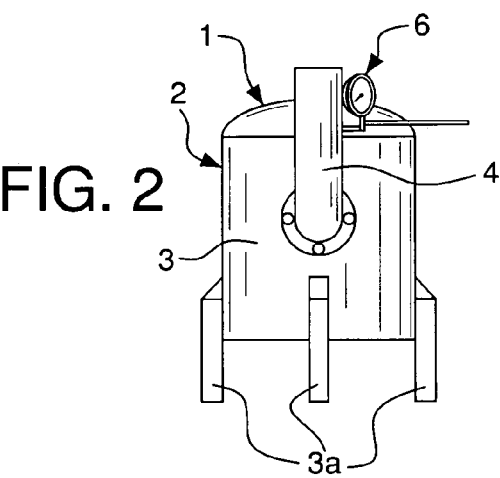
FIG. 2 is an end view of the apparatus disclosed by FIG. 1.

Each of FIGS. 1 and 2 discloses a manufacturing apparatus (1). For example, the manufacturing apparatus (1) comprises a filter (2) in a hollow vessel (3) supported on legs (3a), which filters a fluid that flows into the apparatus (1) from an inlet conduit (4) of the vessel (3). An outlet conduit (5) of the vessel (3) transports filtered fluid to another part of the apparatus (1), not shown.

With continued reference to FIGS. 1 and 2, an engineered fluid delivery apparatus and system comprises a pressure gauge (6) connected by a lengthy hollow inlet that taps into the inlet conduit (4) to measure inlet pressure of the fluid flow. Further, the pressure gauge (6) is connected by a short hollow inlet that taps into the outlet conduit (5) to measure outlet pressure of the fluid flow.

Figure 6:
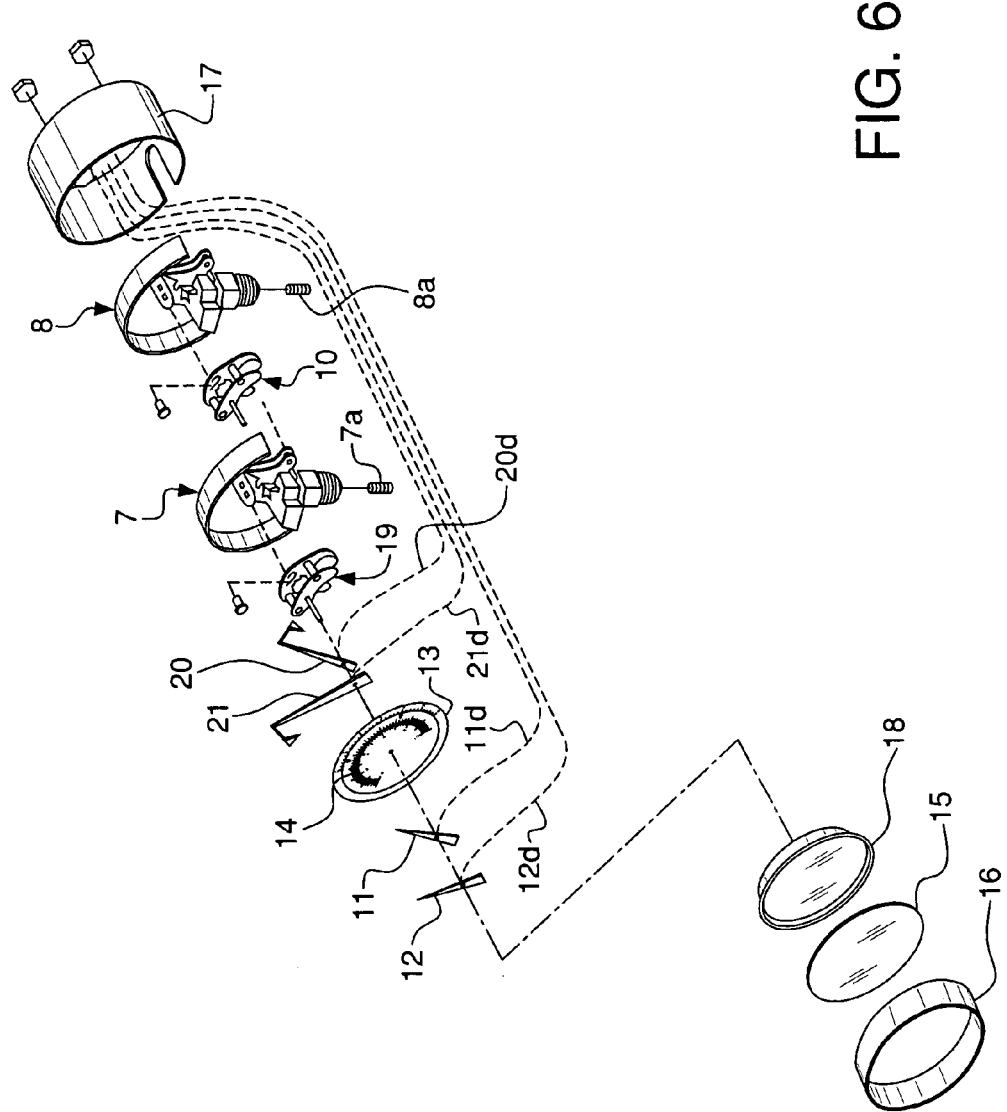
FIG. 6 is an isometric view of component parts of a pressure gauge.

With reference to FIG. 6, the pressure gauge (6) comprises separately operating, multiple pressure sensing elements (7, 8), for example, Bourdon tubes, that separately undergo respective deflections in response to changes in respective pressures being measured. The sensing elements (7, 8) are connected by corresponding pointer mechanisms (9, 10) that translate deflections of the sensing elements (7, 8) to angular movements of respective pointers (11, 12).

FIG. 6 further discloses a dial (13) having an arcuate single gradient scale (14) indicating a range of measured pressures. The dial (13) is covered by a transparent crystal (15) held in place by a compression ring (16) on a exterior housing (17) of the gauge (6). A rotatable bezel (18) encircles the crystal.

The two sensing elements (7, 8) are contained within a single housing (17) that is under atmospheric pressure. The two sensing elements (7, 8) are separated from each other in the housing (17) for independent operation. The two sensing elements (7, 8) move independently of each other in response to respective changes in the inlet and outlet pressures.

Movement of a first sensing element (7) in response to changes in the inlet pressure is translated by a corresponding pointer mechanism (9) to move the corresponding pointer (11) along a range of higher dial readings, while movement of the second sensing element (8) in response to changes in outlet pressure is translated by a corresponding pointer mechanism (10) to move the corresponding pointer (12) along a range of lower dial readings.

The two pointers (11, 12) of the two sensing elements (7, 8) move independently in response to respective changes in the inlet and outlet pressures. The two pointers (11, 12) are superposed for angular movement over a single dial (13), which simultaneously indicate measurements of both inlet and outlet pressures. The dial (13) has a single gradient scale (14) along which the positions of the two pointers (11, 12) indicate the measured inlet and outlet pressures. Further, a differential pressure between the inlet and outlet pressures is indicated by the angular distance between the two pointers (11, 12) along the gradient scale (14).

Figure 4A:
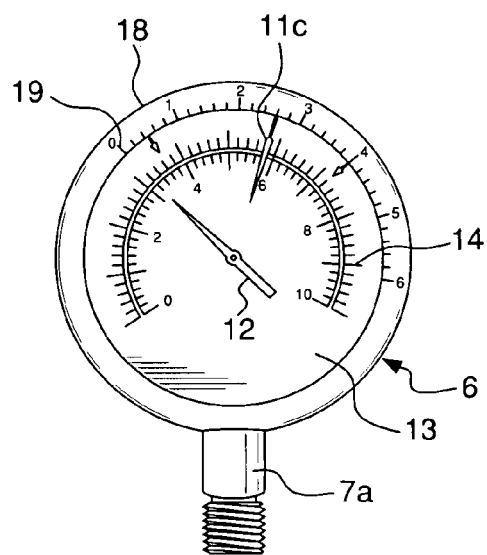
FIG. 4A is a front view of the pressure gauge as disclosed by FIG. 3.
Figure 4B:
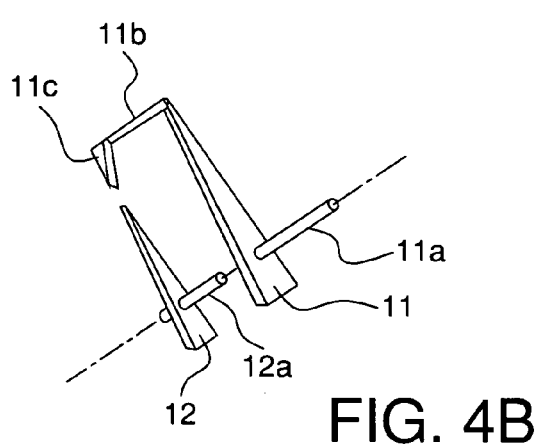
FIG. 4B is an isometric view of pointers of the pressure gauge of FIG. 4A.

FIG. 6 further discloses that the pointers (11, 12) extend radially from respective axles (11a, 11b) that are rotatable to angularly displace the pointers (11, 12) within a plane of movement that is parallel to the plane of the dial (13). The axles (11a, 11b) connect to respective pointer mechanisms (9, 10). FIGS. 4A and 4B disclose an embodiment of the present invention wherein a first pointer (11) has a rotatable axle (11a) in the form of an elongated shaft. A second pointer (12) has a rotatable axle (12a) in the form of an elongated shaft. Thus, the respective axles (11a, 12a) are aligned in tandem, and are independently rotatable. As shown in FIG. 6, the pointers (11) and (12) have respective, insulated electrical wires (11d) and (12d) that extend to electrical terminal connections in the rear side of the housing (17).

FIG. 4A discloses that the pointers (11, 12) extend across a dial (13) having a gradient scale (14) indicating a range of measured pressures. The pointers (11, 12) undergo angular displacement along the gradient scale (14) to indicate respective changes in two pressures being measured by the gauge (6). FIGS. 4A and 4B further disclose one of the pointers (11, 12) having an offset portion (11b) that extends from behind a front of the dial (13) to the front of the dial (13). Further, the offset portion (1b) extends at the periphery of the dial (13). A tip (11c) of the pointer (12) extends for angular displacement along the gradient scale (14).

Figure 5A:
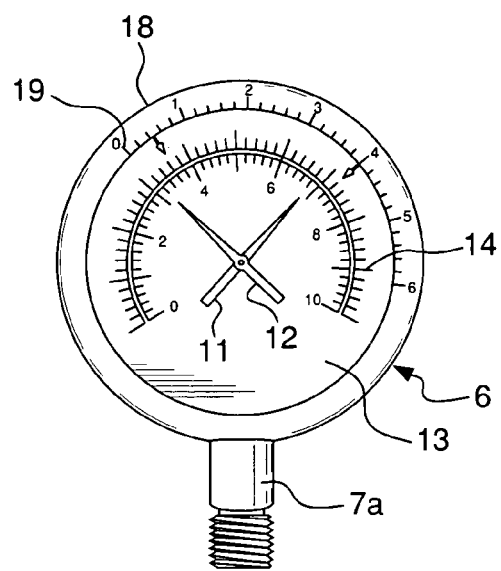
FIG. 5A is a front view of another embodiment of a pressure gauge.
Figure 5B:
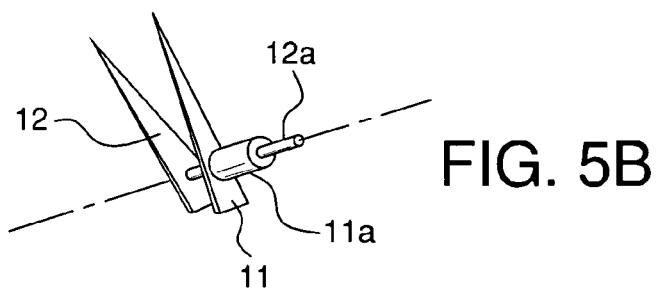
FIG. 5B is an isometric view of pointers of the pressure gauge of FIG. 5A.

FIGS. 5A and 5B disclose an embodiment of the present invention wherein a first pointer (11) has a rotatable axle (11a) in the form of an elongated shaft, and a second pointer (12) has a rotatable axle (12a) in the form of a sleeve that is hollow. Thus, the respective axles (11a, 12a) are concentric, and independently rotatable, one within another.

FIG. 5A discloses that the pointers (11, 12) extend over a dial (13) having a gradient scale (14) indicating a range of measured pressures. FIGS. 5A and 5B further disclose the pointers (11, 12) being in separate planes of movement.

With reference to each of FIGS. 4A and 5A, the pointers (11, 12) separately undergo respective angular movements along the dial (13) in response to changes in respective pressures being measured and being indicated on the dial (13). Further, the gauge (6) indicates a differential pressure measurement between two separate pressure readings indicated by two pointers (11, 12). An advantage of the pressure gauge (6) is that the separate pressure measurements are simultaneous, and are available for immediate recording. Another advantage is that the differential pressure measurement is available simultaneously with the separate pressure measurements, and is available for immediate recording. Another advantage is that a single gauge (6) requires less calibration and maintenance than the two gauges that were required prior to the invention.

According to an embodiment of the present invention, a differential pressure measurement is indicated by the same gradient scale (14) on the dial (13) that indicates the separate pressure readings. However, a calculation is required, by subtracting the outlet pressure from the inlet pressure to obtain the differential pressure.

According to another embodiment of the present invention, a differential pressure measurement is obtained without calculation by a rotatable gradient scale (19), shown in FIG. 4A. The gradient scale (19) is on a transparent faceplate that has an outer bezel (18). The bezel (18) is rotatably mounted on the housing (17) for rotation around the dial (13). The bezel (18) is rotatable to angularly displace the gradient scale (19), and to align a zero value on the gradient scale (19) with a pointer for the low outlet pressure reading. This aligns the second pointer with a value on the gradient scale (19) that corresponds to the differential pressure measurement between the two pointers (11, 12). For example, the rotatable gradient scale (19) is provided on a rotatable bezel (18) mounted on the case. The bezel (18) is rotated to align the zero value of the gradient scale (19) with a first pointer (11) that measures the low outlet pressure. Thus the value on the gradient scale (19) that aligns with a second pointer (12), corresponds to the differential pressure measurement between the inlet pressure measurement and the outlet pressure measurement.

Figure 3:
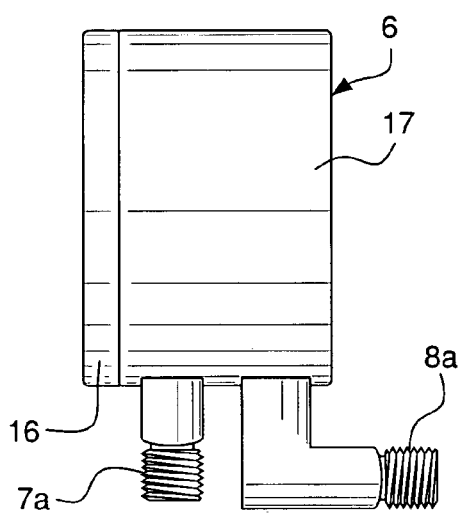
FIG. 3 is a side view of a pressure gauge as disclosed by FIG. 1.

With reference to FIG. 3, the first sensing element (7) is connected by a first hollow coupling (7a) to a short inlet (7b) that taps into a source of outlet pressure to be measured. The second sensing element (8) is connected by a second hollow coupling (8a) to a lengthy inlet (8b) that taps into a source of inlet pressure to be measured. Changes in the inlet pressure correspond to a range of higher gauge readings, while changes in the outlet pressure correspond to a range of lower gauge readings. Fluid flow in the lengthy inlet (8b) to the second sensing element (8) undergoes a pressure loss due to the length of the inlet (8b). However, the pressure loss is nominal relative to the range of higher gauge readings. Fluid flow in the short inlet (7b) undergoes nominal pressure loss due to the short length of the short inlet (7b). Thus, in the gauge (6) of the present invention, the sensing element (8) indicating the higher pressure reading is supplied by the fluid pressure inlet (8b) of long length contributing a nominal higher pressure loss, while the sensing element (7) indicating the lower pressure reading is supplied with the fluid pressure inlet (7b) having a short length contributing a nominal lower pressure loss.

FIG. 6 further discloses a modification of the gauge (6) comprising another embodiment of the present invention. More specifically, the gauge (6) has electrical contacts (20, 21) that comprise switch poles of corresponding switches for activating a conventional, high pressure alarm system, not shown. The electrical contacts (20, 21) connect to insulated electrical wires (20d, 21d), respectively, that extend to respective electrical terminal connections in the back side of the housing (17).

Figure 5C:
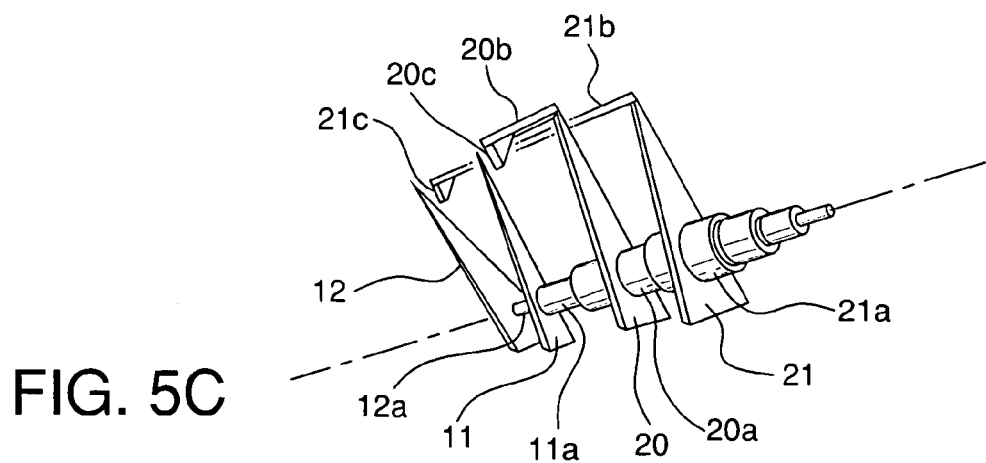
FIG. 5C is an isometric view of alarm contacts and pointers of a pressure gauge.

FIG. 5C discloses the electrical contacts (20, 21) mounted on respective rotatable sleeves (20a, 21a) that are concentric with axles (11a, 12a) for corresponding pointers (11, 12). The sleeves (20a, 21a) and the axles (11a, 12a) are concentric and independently rotatable. The electrical contacts (20, 21) have respective offset portions (20b, 21b) ending in respective tips (20c, 21c). As disclosed by FIG. 4A, the tips (20c, 21c) overhang the front of the dial (13) to provide visual pointers. The sleeves (20b, 21b) are rotated to move the tips (20c, 21c) along the dial (13) to fixed positions that correspond with respective high pressure limit readings on the gradient scale (14). Thus, the high pressure limit readings are provided for the inlet pressure of the inlet conduit (4) and the outlet pressure of the outlet conduit (5). When a corresponding one of the pointers (11, 12) is displaced along the gradient scale (14), and reaches the corresponding one of the high pressure limit readings, a switched electrical connection is made between the respective one of the pointers (11, 12) and one of the respective electrical contacts (20, 21), which closes a respective switch and activates one of the high pressure alarm systems.

An alarm system that is activated according to the present invention, operates with at least one of the following functions, including but not limited to; an audio and/or visual alarm, a shut off switch to cease further fluid flow, or a process control mechanism that adjusts the fluid flow below the high pressure reading that causes the alarm. The axle of the pointer comprises an electrical switch pole of the corresponding alarm circuit.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A pressure gauge comprising:
separately, pressure sensing elements;
pointer mechanisms connecting the sensing elements to respective pointers, the respective pointers being displaceable along a gradient scale, in response to change in respective pressures being sensed by the sensing elements, to simultaneously indicate multiple measured pressure along the gradient scale and a differential pressure between two of the multiple measured pressures.

2. The pressure gauge as recited in claim 1, and further comprising: the respective pointers extending from respective axles that are rotatable to angularly displace the respective pointers along the gradient scale; and the axles are connected to respective pointer mechanisms.

3. The pressure gauge as recited in claim 2, and further comprising: the respective axles are independently rotatable, one within another.

4. The pressure gauge as recited in claim 1, and further comprising: one of the pointers having an offset portion that extends from behind the front of the dial to the front of the dial, and said one of the pointers having a tip that extends over the dial.

5. The pressure gauge as recited in claim 1, and further comprising: a rotatable bezel on a housing; the bezel having a respective gradient scale that is moved by rotating the bezel to indicate a pressure differential measurement on a portion of the respective gradient scale that extends between two of the pointers.

6. The pressure gauge as recited in claim 1, and further comprising: hollow couplings connecting the sensing elements to respective sources of pressure.

7. The pressure gauge as recited in claim 1, and further comprising: one of the sensing elements for measuring a range of high pressures having a hollow coupling for connection to a lengthy inlet supplying a fluid flow under a range of high pressures to be measured, and a pressure loss due to the lengthy conduit being nominal by comparison to the high range of pressures to be measured.

8. The pressure gauge as recited in claim 1, and further comprising: one of the sensing elements indicating a higher pressure reading being supplied with pressure by a fluid pressure inlet of long length contributing a nominal higher pressure loss, while another one of the sensing elements indicating a lower pressure reading being supplied with pressure by a fluid pressure inlet of short length contributing a lower nominal pressure loss.

9. The pressure gauge as recited in claim 1, and further comprising: electrical contacts comprising switch poles of corresponding switches; the electrical contacts overhanging the dial, and being adjusted in positions that coincide with limits of pressure as indicated along the gradient scale; and a switched electrical contact being made between one of the pointers and one of the electrical contacts, when said one of the pointers displaces along the gradient scale to indicate one of the limits of pressure.

10. A method for measuring multiple pressures, comprising the steps of: simultaneously measuring separate pressures by respective pressure sensing elements;
supplying one of the pressure sensing elements with high pressure in an inlet of long length that contributes a nominal high pressure loss in comparison to a range of high pressure being measured; and supplying another one of the pressure sensing elements with low pressure in an inlet of short length that contributes a nominal pressure loss due to the short length; and
simultaneously indicating measurements of the separate pressures by respective pointers along a single gradient.

11. A method for measuring multiple pressures, as recited in claim 10, further comprising the step of: indicating a differential pressure measurement between two of the pointers along the single gradient scale.

12. A method for measuring multiple pressures, as recited in claim 10, further comprising the step of: angularly moving the respective pointers along the single gradient scale by rotating respective axles one within another.

13. A method for measuring multiple pressures, as recited in claim 10, further comprising the steps of: activating an alarm circuit by making switched electrical connection between one of the pointers and a corresponding electrical contact that provides a switch pole at a location coinciding with an upper limit of pressure being measured along the gradient scale.

* * * * *

UNITED STATES PATENT AND TRADEMARK OFFICE
CERTIFICATE OF CORRECTION

| | | |
|---|---|---|
| PATENT NO. | : 7,004,032 B2 | Page 1 of 1 |
| APPLICATION NO. | : 10/637346 | |
| DATED | : February 28, 2006 | |
| INVENTOR(S) | : Johnson Lien et al. | |

It is certified that error appears in the above-identified patent and that said Letters Patent is hereby corrected as shown below:

Col. 6 line 62
Claim 14 was inadvertently left out, and should read:
    14. A pressure gauge comprising:
    separately operating, pressure sensing elements;
    pointer mechanisms connecting the sensing elements to respective pointers, the respective pointers being displaceable along a gradient scale disposed within a housing, in response to changes in respective pressures being sensed by the sensing elements, to simultaneously indicate multiple measured pressures along the gradient scale, and
    a bezel rotatable with respect to the housing, the bezel having a respective gradient scale that is moved by rotating the bezel to indicate a pressure differential measurement on a portion of the respective gradient scale that extends between two of the pointers.

Signed and Sealed this

Fifteenth Day of August, 2006

JON W. DUDAS
*Director of the United States Patent and Trademark Office*